US012749865B2

(12) United States Patent
Laux et al.

(10) Patent No.: US 12,749,865 B2
(45) Date of Patent: Sep. 29, 2026

(54) LASER BEAM AMPLIFICATION DEVICE

(71) Applicant: THALES, Courbevoie (FR)

(72) Inventors: Sébastien Laux, Elancourt Cedex (FR); Alain Pellegrina, Elancourt Cedex (FR); Sandrine Ricaud, Elancourt Cedex (FR); Olivier Casagrande, Elancourt Cedex (FR); Mathilde Charbonneau, Elancourt Cedex (FR)

(73) Assignee: THALES, Courbevoie (FR)

( * ) Notice: Subject to any disclaimer, the term of this patent is extended or adjusted under 35 U.S.C. 154(b) by 726 days.

(21) Appl. No.: 18/267,736

(22) PCT Filed: Dec. 13, 2021

(86) PCT No.: PCT/EP2021/085521
§ 371 (c)(1),
(2) Date: Jun. 15, 2023

(87) PCT Pub. No.: WO2022/128931
PCT Pub. Date: Jun. 23, 2022

(65) Prior Publication Data

US 2024/0113489 A1 Apr. 4, 2024

(30) Foreign Application Priority Data

Dec. 17, 2020 (FR) ....................................... 2013478

(51) Int. Cl.
*H01S 3/06* (2006.01)
*H01S 3/00* (2006.01)
(Continued)

(52) U.S. Cl.
CPC .......... *H01S 3/0604* (2013.01); *H01S 3/0064* (2013.01); *H01S 3/042* (2013.01); *H01S 3/2325* (2013.01)

(58) Field of Classification Search
CPC .... H01S 3/0604; H01S 3/0606; H01S 3/0615; H01S 3/0617; H01S 3/2325; H01S 3/2333; H01S 3/081–0817; H01S 3/08059
See application file for complete search history.

(56) References Cited

U.S. PATENT DOCUMENTS 6,570,713 B2 * 5/2003 Bittenson ................ G02B 5/04 372/100
6,834,064 B1 12/2004 Paschotta et al.
(Continued)

FOREIGN PATENT DOCUMENTS

CN 1411113 A 4/2003
CN 1890847 A 1/2007
(Continued)

OTHER PUBLICATIONS

French Application No. 20 13478, Search Report dated Aug. 4, 2021, 2 pages.
(Continued)

*Primary Examiner* — Joshua King
(74) *Attorney, Agent, or Firm* — Soquel Group LLC

(57) ABSTRACT

The present invention relates to a device for amplifying a multi-wavelength laser beam, comprising:

Figure 1:
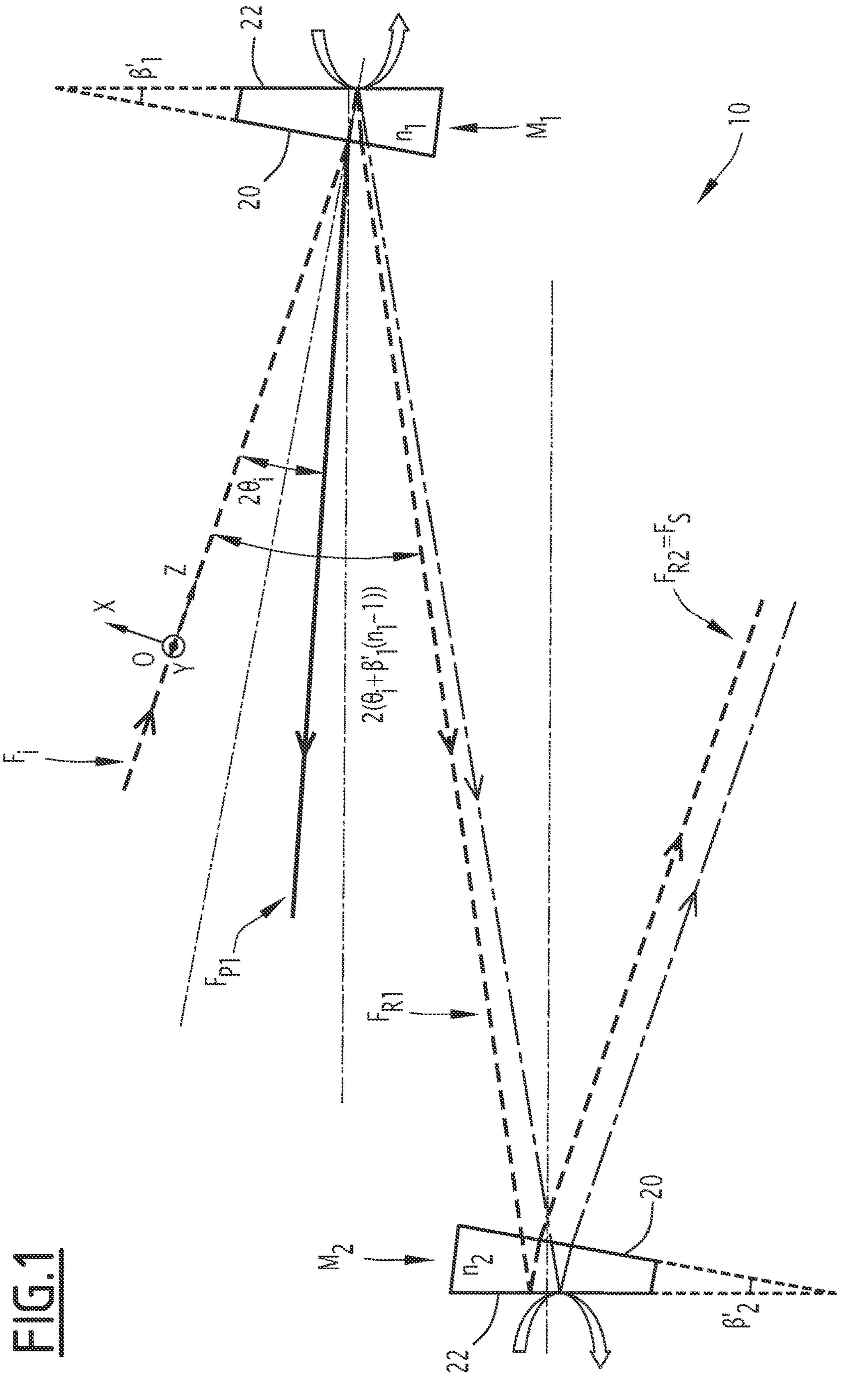

a. a first active laser medium having a front face and a rear face which is reflective, inclined with respect to each other at a first non-zero inclination, and
b. a second active laser medium having a front face suitable for receiving the beam reflected by the rear face and refracted by the front face of the first active laser medium, and a reflective rear face, inclined with respect to each other at a second non-zero inclination, the first inclination, the second inclination and the orientation of the second active laser medium being such that the sub-beams of each wavelength, forming (Continued)

the output beam of the second active laser medium, are parallel to each other at the output of the second active laser medium.

10 Claims, 4 Drawing Sheets

(51) Int. Cl.

| | |
|---|---|
| ***H01S 3/042*** | (2006.01) |
| ***H01S 3/23*** | (2006.01) |

(56) References Cited

U.S. PATENT DOCUMENTS

| | | | | |
|---|---|---|---|---|
| 2002/0172253 | A1* | 11/2002 | Vetrovec | H01S 3/0604 372/95 |
| 2005/0129081 | A1* | 6/2005 | Erhard | H01S 3/081 372/71 |
| 2015/0303642 | A1* | 10/2015 | Laux | H01S 3/0615 359/333 |
| 2019/0140417 | A1* | 5/2019 | Lorbeer | H01S 3/0621 |

FOREIGN PATENT DOCUMENTS

| | | | | |
|---|---|---|---|---|
| CN | 102570251 | A | 7/2012 | |
| CN | 102664340 | A | 9/2012 | |
| CN | 103109423 | A | 5/2013 | |
| CN | 104767116 | A | 7/2015 | |
| CN | 104885314 | A | 9/2015 | |
| EP | 2475054 | A1 * | 7/2012 | H01S 3/0604 |
| EP | 2915226 | A2 | 9/2015 | |
| JP | 2002280651 | A | 9/2002 | |
| JP | 2010520491 | A | 6/2010 | |
| JP | 2013502725 | A | 1/2013 | |
| JP | 2016500928 | A | 1/2016 | |
| WO | WO-0025394 | A1 * | 5/2000 | H01S 3/07 |

OTHER PUBLICATIONS

International Patent Application No. PCT/EP2021/085521, Search Report mailed Mar. 16, 2022, 6 pages.

Mende J et al: “Concept of neutral gain modules for power scaling of thin-disk lasers”, Applied Physics B ; Lasers and Optics, Springer, Berlin, DE, vol. 97, No. 2, Sep. 12, 2009 (Sep. 12, 2009), pp. 307-315, XP019758912, ISSN: 1432-0649, DOI: 10.1007/S00340-009-3726-2.

* cited by examiner

LASER BEAM AMPLIFICATION DEVICE

CROSS-REFERENCE TO RELATED APPLICATIONS

This application is a national stage filing of International Application No. PCT/EP2021/085521, filed Dec. 13, 2021, which claims priority to French Application No. 20 13478, filed Dec. 17, 2020. The entire disclosures of the aforementioned patent applications are incorporated herein by reference.

The present invention relates to a device for amplifying a multi-wavelength laser beam.

The field of the invention is the field of solid-state laser sources for scientific, industrial, medical and military applications. More specifically, the invention is advantageously used for active laser medium materials (such as a crystal) which have a relatively small thickness compared to the aperture thereof along the axis of propagation of the laser beam, typically less than 1:3.

The technology of pumping lasers has substantially developed in recent years and it is now possible to have a pulsed laser source which gives an average pumping power of at least one hundred watts.

However, a certain number of configurations are not compatible with the new generation of pump lasers for which high energy and high average power (higher repetition rate) are sought.

In the current state of the art, different solutions are used for the extraction of thermal power in an active laser medium, by working on the form factor of the active laser medium, typically amplifier fibers, very thin disks, slab and so-called the thick disks.

The thick disc solution is well suited to certain active laser media such as amorphous materials (such as glasses), transparent ceramics or crystals such as Ti:SA (abbreviation for Titanium:Sapphire). Due to the large amplification spectrum of the material, such solution gives access to high energy levels, high average powers, and short pulse durations.

In thick disk technology, the active laser medium is cooled through the rear face thereof. Cooling is then obtained by means of a fluid, either liquid or gas, or a solid. Such cooling through the rear face increases the heat exchange surface. Moreover, same can be used for generating a thermal gradient along the direction of propagation of the laser through the active laser medium, and also for achieving a high thermal extraction. The index variations related to the variations of temperature in the active laser medium are gradients oriented mainly along the same direction as the direction of propagation of the laser beam.

However, laser amplification devices with rear surface cooling induce a geometrical turning back of the beam due to the reflective rear surface of the active laser medium (e.g. a crystal). The output face of the active laser medium is then the same as the input face, which means that the spurious pulses (due to the spurious reflections on the front face) are found before the main pulse, hence degrading the temporal contrast of the pulse. The temporal contrast is defined as the ratio between the intensity of the main pulse and the foot of the pulse and/or any spurious pulses.

To avoid such degradation, it is known from patent EP 2 915 226 B how to modify the air/crystal interface, so as to separate the main pulse and the spurious pulses. For this purpose, the front face of the active laser medium is inclined with respect to the rear face thereof at a non-zero angle. Thereby, after propagation through the active laser medium, the spurious reflections are spatially separated from the main pulse and the temporal contrast is no longer degraded by the spurious reflections.

For short pulses (with broad spectrum), said angle produces a prismatic effect which is compensated for by a compensation prism positioned along the path of the beam, as described in EP 2 915 226 B. Thereby, when a plurality of passes through the active laser medium are carried out, a plurality prisms have to be used in the amplification device.

Beyond the financial impact, the use of many optical [parts] for transmission is a source of optical loss and a potential source of failure (damage leading to the unavailability of the laser and a cost of repairing the part and labor for realignment).

There is thus a need for an amplification device which would minimize optical losses while remaining satisfactory in terms of cooling and temporal contrast.

To this end, the subject matter of the invention is a device for amplifying a multi-wavelength laser beam, the device comprising:

a. a first solid active laser medium having a first refractive index, the first active laser medium having at least two plane faces among a front face suitable for receiving the beam to be amplified, called the incident beam, and a reflective rear face, the front face being inclined with respect to the rear face at a first non-zero inclination, the rear face being suitable for being cooled, and b. a second solid active laser medium having a second refractive index, the second active laser medium having at least two plane faces among a front face suitable for receiving the beam reflected by the rear face and refracted by the front face of the first active laser medium, and a reflective rear face, the front face being inclined with respect to the rear face at a second non-zero inclination, the rear face being suitable for being cooled, the second active laser medium being arranged along the path of the beam reflected by the rear face and refracted by the front face of the first active laser medium, the first inclination, the second inclination and the orientation of the second active laser medium being such that the sub-beams of each wavelength, forming the output beam of the second active laser medium, are parallel to each other at the output of the second active laser medium.

According to other advantageous aspects of the invention, the device comprises one or a plurality of the following features, taken individually or according to all technically possible combinations:

the front face of the first active laser medium is perpendicular to an axis Oz, the first inclination forming an angle $\beta_1'$ on a plane xOz and $\beta_1''$ on a plane yOz, the second inclination forming an angle $\beta_2'$ on a plane xOz and $\beta_2''$ on a plane yOz, the following condition being satisfied:

$$\beta_1' = \frac{((n_2 - 1)\cdot\beta_{2'})}{n_1 - 1} \text{ and } \beta_1'' = \frac{((n_2 - 1)\cdot\beta_{2''})}{n_1 - 1}.$$

the second active laser medium is arranged with respect to the first active laser medium so that:

a. the front face of the second active laser medium is parallel to the front face of the first active laser medium, and b. the rear face of the second active laser medium is parallel to the rear face of the first active laser medium;

the beam at the output of the second active laser medium has a widened diameter (compared to the diameter of the incident beam, the amplification device comprising a compensation optical assembly suitable for compensating for the widening of the beam at the output of the second active laser medium so that the beam at the output of the amplification device has a diameter substantially equal to the diameter of the incident beam;

the compensation optical assembly comprises:

a. a third solid active laser medium having a third refractive index, the third active laser medium having at least two plane faces among a front face suitable for receiving the beam at the output of the second active laser medium and a reflective rear face, the front face (being inclined with respect to the rear face at a third non-zero inclination, the rear face being suitable for cooling, b. a fourth solid active laser medium having a fourth refractive index, the fourth active laser medium having at least two plane faces among a front face suitable for receiving the beam reflected by the rear face and refracted by the front face of the third active laser medium, and a reflective rear face, the front face being inclined with respect to the rear face at a fourth non-zero inclination, the rear face being suitable for being cooled, the fourth active laser medium being arranged along the path of the beam reflected by the rear face and refracted by the front face of the third active laser medium, the third inclination, the fourth inclination, the orientation of the third active laser medium and the orientation of the fourth active laser medium being such that the output beam of the fourth active laser medium has a diameter substantially equal to the diameter of the incident beam and that the sub-beams of each wavelength, forming said output beam, are parallel to each other at the output of the fourth active laser medium;

the front face of the third active laser medium is perpendicular to an axis Oz, the third inclination forming an angle $\beta_3'$ on a plane xOz and $\beta_3''$ on a plane YOZ, the third inclination forming an angle $\beta_3'$ on a plane xOz and $\beta_3''$ on a plane yOz, the following condition being satisfied:

$$\beta_3' = \frac{((n_4 - 1)\cdot\beta_{4'})}{n_3 - 1} \text{ and } \beta_3'' = \frac{((n_4 - 1)\cdot\beta_{4''})}{n_3 - 1}.$$

the third active laser medium is arranged with respect to the fourth active laser medium so that:

a. the front face of the third active laser medium is parallel to the front face of the fourth active laser medium, and b. the rear face of the third active laser medium is parallel to the rear face of the fourth active laser medium;

the first active laser medium, the second active laser medium, the third active laser medium and the fourth active laser medium are identical;

the first medium, the second medium, the third medium and the fourth medium form a so-called reference amplification unit, the beam reflected by the rear face and refracted by the front face of the fourth medium forming the output beam of the reference amplification unit, the amplification device comprising one or a plurality of successive amplification units, identical to the reference amplification unit, each amplification unit being arranged for receiving, as an input beam, the output beam of the preceding amplification unit;

the compensation optical assembly comprises at least one mirror arranged so that the output beam of the amplification device is superimposed on the incident beam;

The front face of the active laser medium is suitable for receiving the incident beam and for reflecting a beam called the first spurious beam, from the incident beam, the first optical return unit being arranged outside the path of the first spurious beam.

The front face of the active laser medium is suitable for receiving the beam at the output of the first active laser medium and for reflecting a beam called the second spurious beam, from the received beam, the third active laser medium being arranged outside the path of the first spurious beam, and The front face of the third active laser medium is suitable for receiving the beam at the output of the second active laser medium and for reflecting a beam called the third spurious beam, from the received beam, the fourth active laser medium being arranged outside the path of the third spurious beam.

Figure 2:
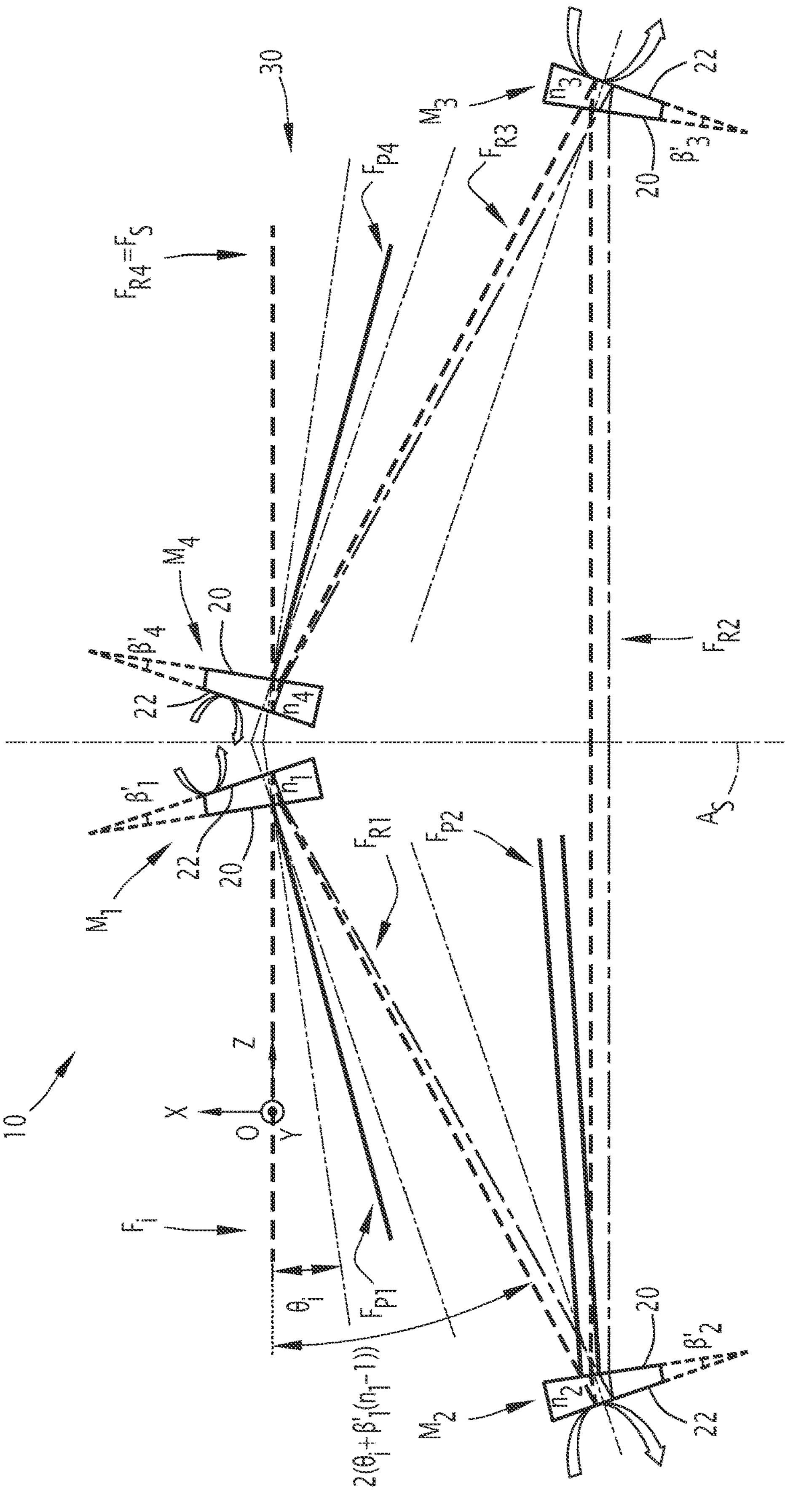
Figure 3:
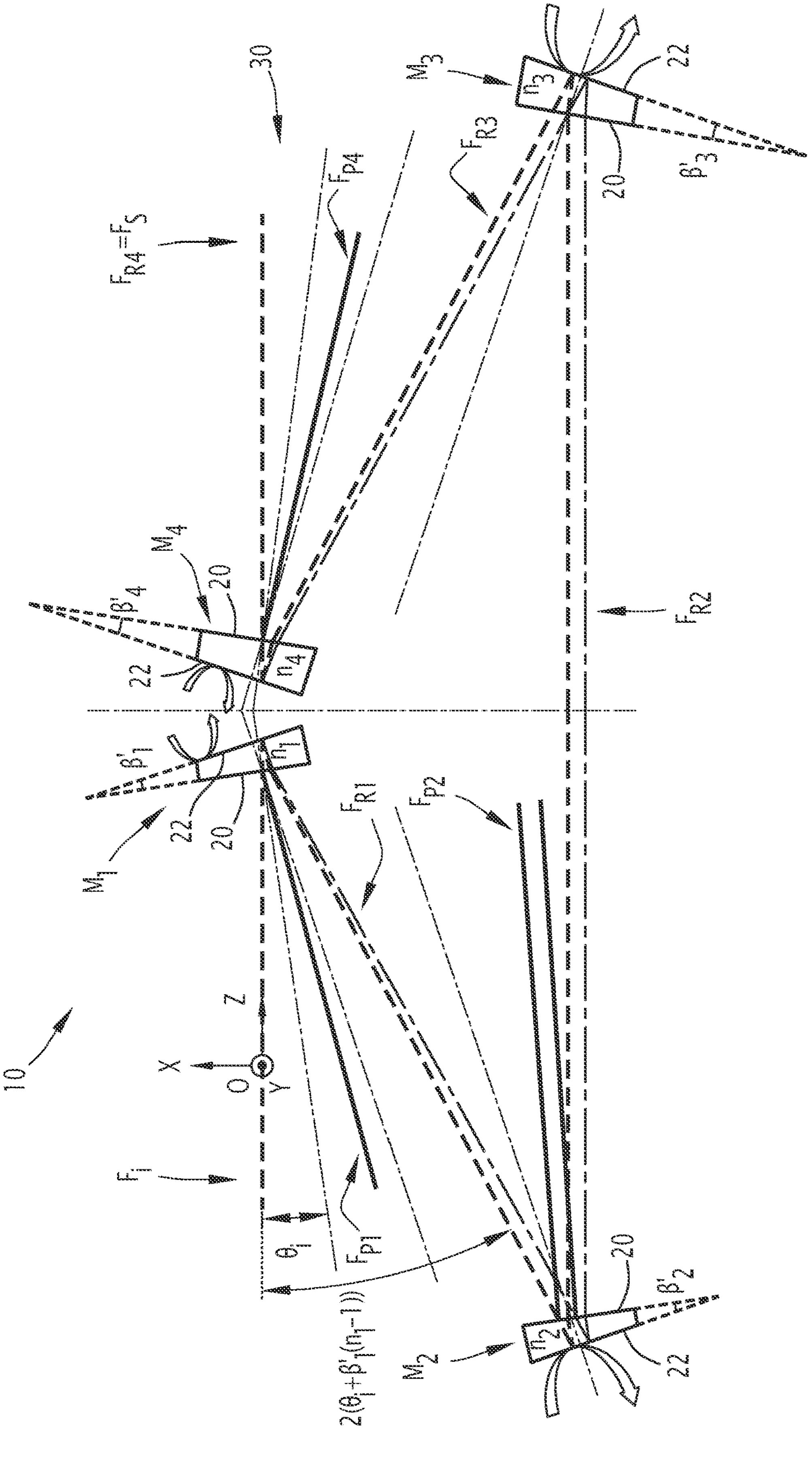
Figure 4:
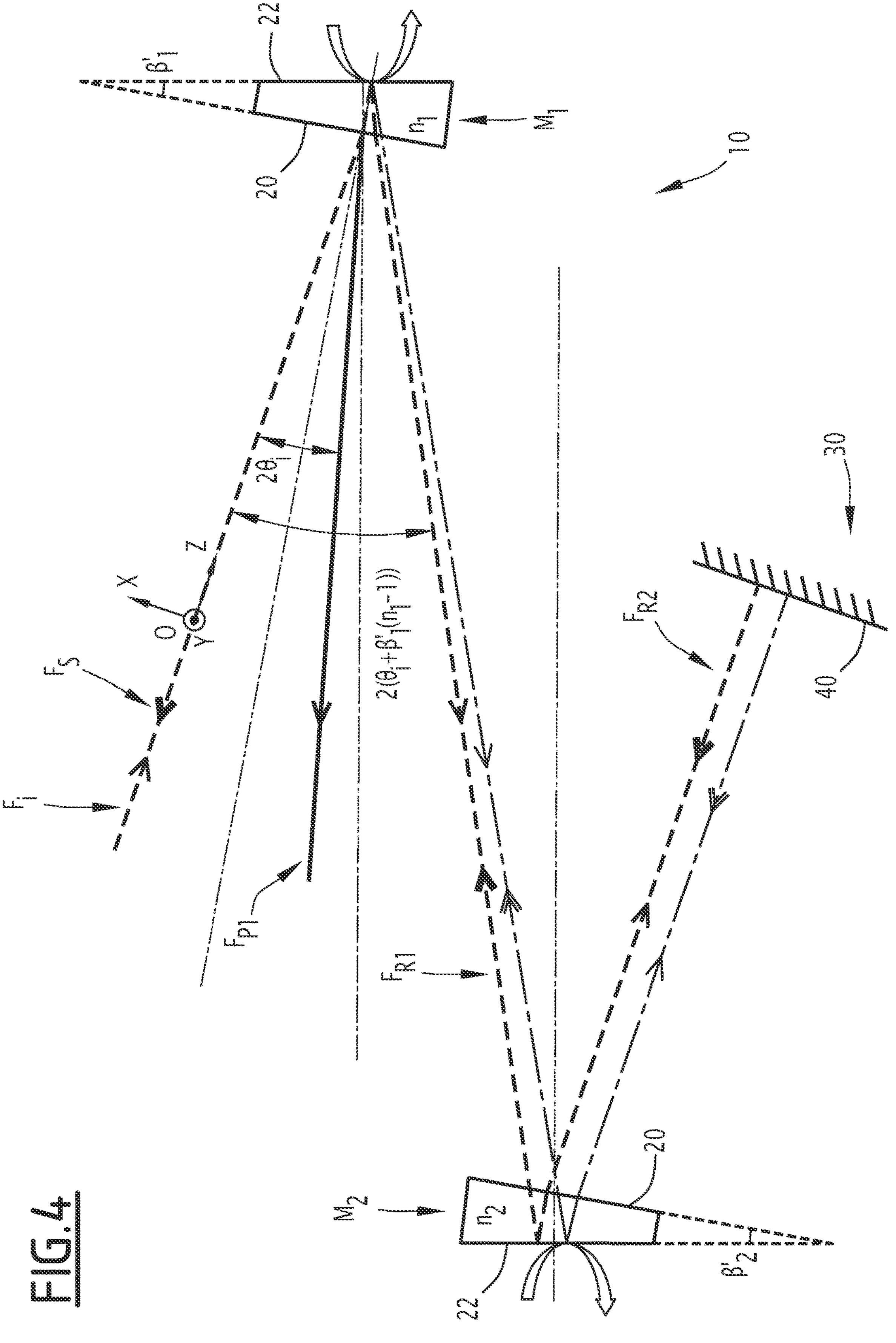

Other features and advantages of the invention will appear upon reading the following description which follows embodiments of the invention, given only as a limiting example, and making reference to the following drawings:

FIG. 1, a schematic plan view representation of an amplification device according to a first embodiment, FIG. 2, a schematic plan view representation of an amplification device according to an example of use of a second embodiment, FIG. 3, a schematic plan view representation of an amplification device according to another example of use of a second embodiment, and FIG. 4, a schematic plan view representation of an amplification device according to a third embodiment, Hereinafter in the description, a propagation direction z is defined, represented in the figures by an axis z and corresponding to the propagation direction of the laser beam. A first transverse direction is defined, perpendicular to the direction of propagation, and represented in the figures by an axis x, such that the plane (xOz) corresponds to a top view of the amplification device 10. A second transverse direction y is also defined, perpendicular to the direction of propagation z and to the first transverse direction x. The second transverse direction y is represented in the figures by an axis y and is such that the plane (yOz) corresponds to a side view of the amplification device 10.

Hereinafter in the description, the term "chromatic spatial dispersion" means the angular dispersion of a beam due to variations in the angle of deviation as a function of wavelengths in an optical surface. The term "chromatic lateral dispersion" means the widening of the diameter of a beam as a function of the wavelengths (shift of the pupils) following passage through two optical surfaces the interfaces of which being parallel (plates with parallel faces).

A first embodiment of an amplification device 10 is illustrated in FIG. 1.

The amplification device 10 is configured for amplifying a laser beam, in particular a multi-wavelength pulsed laser beam. The beam to be amplified is e.g. an infrared beam.

The beam to be amplified has e.g, an average power greater than 10 Watts (W).

The amplification device 10 according to the first embodiment comprises at least an active laser medium M1 and at least a second active laser medium M2.

The first medium M1 is a solid medium. The first medium M1 is e.g. a crystal such as titanium-doped sapphire, or Yb:YAG, Yb:CaF2 or a polymer, a ceramic or a glass or any other material in the solid state.

The first medium M1 has a first refractive index n1. Preferentially, the following relationship is verified:

$$n1 \gg \frac{(n1-1)}{v1}$$

Where ν1 is the constringence of the first active laser medium M1. The above is intended to preserve the multi-wavelength character of the beam $F_S$ at the output of the amplification device 10.

The first medium M1 has at least two plane faces among a front face 20 suitable for receiving the beam to be amplified, called the incident beam $F_I$, and a reflective rear face 22.

The front face 20 is inclined with respect to the rear face 22 at a non-zero inclination $\beta_1$(angle). The first medium M1 has the shape of a disk the front and rear faces of which are inscribed in a prism with a trapezoidal base (FIG. 1) or triangular base. In the following, $\beta_1$' is the projection of the inclination $\beta_1$ on the plane (xOz) and $\beta_1$" is the projection of the inclination $\beta_1$ on the plane (yOz).

In the particular example shown in FIG. 1, the angle $\beta_1$' is equal to the inclination $\beta_1$' and the angle $\beta_1$" is zero. The base of the first medium M1 is thus contained in a plane parallel to the plane (xOz). As will be described hereinafter, the above can be used for ejecting the spurious pulses in the plane (xOz). However, such a configuration is however given as an example, since the angles β'$_1$ and $\beta_1$" can be both non-zero.

The front face 20 of the first medium M1 is suitable for receiving the incident beam $F_I$ and for reflecting a spurious beam, called the first spurious beam $F_{P1}$ and for refracting a beam called the first useful beam $F_{R1}$ after such a beam has been reflected by the rear face 22.

Advantageously, the front face 20 is anti-reflection treated.

The rear face 22 of the first active laser medium M1 is suitable for reflecting, after the passage thereof through the front face 20 of the first active laser medium M1, so as to form the first useful beam $F_{R1}$.

The rear face 22 is suitable for being cooled by a cooling device which is e.g. comprised in the amplification device 10. The cooling is represented in FIG. 1 by an arrow appended to the rear face 22.

The second active laser medium M2 is a solid medium. The second medium M2 is e.g. a crystal such as titanium-doped sapphire, or Yb:YAG, Yb:CaF2 or a polymer, a ceramic or a glass or any other material in the solid state.

The second medium M2 has a second refractive index n2. Preferentially, the following relationship is verified:

$$n2 \gg \frac{(n2-1)}{v2}$$

Where ν2 is the constringence of the second active laser medium M2. The above is intended to preserve the multi-wavelength character of the beam $F_S$ at the output of the amplification device 10.

The medium M2 has at least two plane faces among a front face 20 suitable for receiving the beam to be amplified, called the incident beam $F_I$, and a reflective rear face 22.

The front face 20 is inclined with respect to the rear face 22 at a non-zero inclination $\beta_2$ (angle). Thereby, the second medium M2 has the shape of a disk the front and rear faces of which are inscribed in a prism with a trapezoidal base (FIG. 1) or triangular base. In the following, $\beta_2$' is the projection of the inclination $\beta_2$ on the plane (xOz) and $\beta_2$" is the projection of the inclination $\beta_2$ on the plane (yOz).

In the particular example shown in FIG. 1, the angle $\beta_2$' is equal to the inclination $\beta_2$ and the angle $\beta_2$" is zero. The base of the second medium M2 is thus contained in a plane parallel to the plane (xOz). As will be described hereinafter, the above can be used for ejecting the spurious pulses in the plane (xOz). However, such a configuration is however, given as an example, since the angles $\beta_2$' and $\beta_2$" can be both non-zero.

In a preferred embodiment, the second medium M2 is identical to the first medium M1. Thus, n1=n2 and $\beta_1=\beta_2$. Advantageously, the first medium M1 and the second medium M2 were manufactured during the same manufacturing process.

Advantageously, the front face 20 is anti-reflection treated.

The rear face 22 is suitable for being cooled by a cooling device which is e.g. comprised in the amplification device 10. The cooling is represented in FIG. 1 by an arrow appended to the rear face 22.

The second active laser medium M2 is arranged with respect to the first medium M1 so as to be along the path of the first useful beam $F_{R1}$. Such a first useful beam $F_{R1}$ is thereby received on the front face 20 of the second medium M2. Thereby, the front face 20 of the second medium M2 is suitable for reflecting a spurious beam, called the second spurious beam $F_{P2}$ (not shown in FIG. 1 so as not to overload the figure) and for refracting a useful beam, called the second useful beam $F_{R2}$, after such a beam was reflected by the rear face 22 of the second medium M2.

The first inclination $\beta_1$, the second inclination $\beta_2$ and the orientation of the second active laser medium M2 are chosen so that the sub-beams of each wavelength, forming the second useful output beam $F_{R2}$ of the second active laser medium M2, are parallel to each other at the output of the second active laser medium M2. In FIG. 1, only two sub-beams are shown so as not to overload the figure. The second medium M2 is thereby used for compensating for the chromatic spatial dispersion induced by the prismatic effect resulting from the inclination $\beta_1$ between the front face 20 and the rear face 22 of the first medium M1.

Advantageously, the following condition is verified:

$$\beta_1' = \frac{((n_2-1)\cdot\beta_{2'})}{n_1-1} \text{ and } \beta_1'' = \frac{((n_2-1)\cdot\beta_{2''})}{n_1-1}$$

Advantageously, the second active laser medium M2 is arranged with respect to the first active laser medium M1 so that:

- the front face 20 of the second active laser medium M2 is parallel to the front face 20 of the first active laser medium M1, and
- the rear face 22 of the second active laser medium M2 is parallel to the rear face 22 of the first active laser medium M1.

Thereby, if the two media M1 and M2 were joined together without modifying the respective orientations thereof, an optical surface with parallel faces would be obtained.

Advantageously, the second active laser medium M2 is arranged outside the path of the first spurious beam $F_{P1}$.

Preferentially, the second medium M2 is arranged at a distance L from the first medium M1 so that the amplified beams (output beam $F_S=F_{R2}$ in FIG. 1), the spurious beams $F_{P1}$ and the incident beams $F_I$ are spatially separated. Such separation is obtained for L such that:

$$L > \frac{\Phi}{(\tan(2(\theta_i + \beta_1' \cdot n_1))} \text{ or } L > \frac{\Phi}{(\tan(2(\varphi_i + \beta_1'' \cdot n_1))}$$

Where:

Φ is the diameter of the incident beam $F_I$, $\theta_i$ Is the angle of incidence in the plane (xOz) of the beam incident on the front face 20 of the first medium M1, $\varphi_i$ is the angle of incidence in the plane (yOz) of the beam incident on the front face 20 of the first medium M1, $$\beta_1'$$

is the angle resulting from the projection of the inclination $\beta_1$ on the plane (xOz), $$\beta_1'$$

Is the angle resulting from the projection of inclination $\beta_1$ on the plane (yOz), and $n_1$ is the optical index of the first medium M1.

The operation of the amplification device 10 according to the first embodiment will now be described.

Initially, the beam (the pulse) to be amplified $F_I$ of diameter Φ arrives on the front face 20 of the active laser medium M at an angle of incidence θi in the plane (xOz) and an angle of incidence $\varphi_i$ in the plane (yOz).

The useful beam is reflected by the rear face 22, the spurious beam $F_{P1}$ is reflected by the front face 20. The spurious beam, also referred to as spurious pulses, is deflected on the front face 20 by an angle 2θi in the plane (xOz) and $2\varphi_i$ in the plane (yOz). The amplified beam $F_{R1}$ in the active laser medium M1, also referred to as the main pulse, is deflected at the output by an angle $2(\theta i+\beta_1'\cdot(n1-1)$ in the plane (xOz) and by an angle $2(\varphi_i+\beta_1'\cdot(n1-1)$ in the plane (yOz).

Since the source is a multi-wavelength laser source, the angle $\beta_1'$ formed by the faces 20 and 22 in the plane (xOz) and the angle $\beta_1''$ formed by the faces 20 and 22 in the plane (yOz) produce a prismatic effect. Thereby, after passing through the first active laser medium M1, the wavelengths of the beam $F_{R1}$ refracted by the front face 20 and reflected by the rear face 22 of the first medium M1 (useful beam) are angularly separated.

The second medium M2 arranged after the separation of the useful beam $F_{R1}$ and the spurious beam $F_{P1}$, along the path of the useful beam $F_{R1}$ is used for correcting the chromatic spatial dispersion according to the wavelengths.

More particularly, in the particular example shown in FIG. 1, $\varphi_i=0$, $\beta_1'=\beta_2'=\beta$ et $\beta_1''=\beta_2''=0$, with the result that the whole propagation takes place in the plane (xOz).

It should be noted that at the output of the active laser medium M2, the spectral components of the amplified beam $F_{R2}$ form a spot of diameter Φ+ΔΦ. It will be noted that ΔΦ includes the increase in diameter, brought in by the divergence of the beam during the double crossing of the first active laser medium M1, then brought in by the divergence of the beam along the path between the output face (front face 20) of the first medium M1 and the second medium M2. The same diameter Φ+ΔΦ is found at the output of the second active laser medium M2. To preserve the multi-wavelength character of the output beam, the widening ΔΦ of the diameter of the amplified beam $F_{R2}$ has to be small compared with Φ. This is the case when $$n_1 \gg \frac{n1-1}{\nu_1}.$$

Indeed, $$\Delta\Phi = L\cdot\tan(2\cdot\beta_1\cdot\Delta n1) = L\cdot\tan\left(2\cdot\beta_1\cdot\frac{1}{\nu_1}\cdot(n1-1)\right) \text{ and,}$$

$$(2(\theta_i+\beta_1\cdot n_1)) \gg 2\cdot\beta_1\cdot\frac{1}{\nu_1}\cdot(n1-1) \text{ when } n_1 \gg \frac{n1-1}{\nu_1},$$

which means that ΔΦ<<Φ.

Thereby, the amplification device 10 according to the first embodiment is used for compensating for the chromatic spatial dispersion induced by the inclination β of the first active laser medium M1 without, however, bringing in additional losses. The compensation is, indeed, achieved by another active laser medium which brings in no losses, but, on the contrary, more gain than a single thick disk.

The amplification device 10 according to the first embodiment is thus used for minimizing optical losses while remaining satisfactory in terms of cooling and temporal contrast.

Such an amplification device 10 can be further used for sharing the gain in a plurality of disks, which has advantages for the thermal load per disk and for the transverse lasing.

According to a second embodiment, as can be seen in FIGS. 2 and 3, the elements identical to the amplification device 10 according to the first embodiment described with reference to FIG. 1 are not repeated. Only the differences are highlighted.

In the second embodiment, in addition to the elements of the first amplification device 10, the amplification device 10 comprises an optical compensation assembly 30 suitable for compensating the widening ΔΦ of the beam $F_{R2}$ at the output of the second active laser medium M2 (beam reflected by the rear face 22 and refracted by the front face 20) so that the beam $F_S$ at the output of the amplification device 10 has a diameter substantially equal to the diameter Φ of the incident beam $F_I$. The compensation device 30 is thereby suitable for compensating for the chromatic lateral dispersion.

As illustrated in FIGS. 2 and 3, the compensation optical assembly 30 comprises a third active laser medium M3 and a fourth active laser medium M4.

The third medium M3 is a solid medium. The third medium M3 is e.g. a crystal such as titanium-doped sapphire, or Yb:YAG, Yb:CaF2 or a polymer, a ceramic or a glass or any other material in the solid state.

The third medium M3 has a third refractive index n3.

Preferentially, the following relationship is verified:

$$n3 \gg \frac{(n3-1)}{v3}$$

Where ν3 is the constringence of the third active laser medium M3. The above is intended to preserve the multi-wavelength character of the beam $F_S$ at the output of the amplification device 10.

The third medium M3 has at least two plane faces among a front face 20 suitable for receiving the second useful beam $F_{R2}$ at the output of the second active laser medium M2, and a reflective rear face 22.

The front face 20 of the third medium M3 is inclined with respect to the rear face 22 of the third medium M3 at a non-zero inclination $\beta_3$. The third medium M3 thereby has the shape of a disk the front and rear faces of which are inscribed in a prism with a trapezoidal base (FIGS. 2 and 3) or a triangular base. Hereinafter, $\beta_3'$ is the projection of the inclination $\beta_3$ on the plane (xOz) and $\beta_3''$ is the projection of the inclination $\beta_3$ on the plane (yOz).

In the particular example of FIGS. 2 and 3, the angle $\beta_3'$ is equal to the inclination $\beta_3$ and the angle $\beta_3''$ is zero. The base of the third medium M3 is thereby contained in a plane parallel to the plane (xOz). As will be described hereinafter, the above can be used for ejecting the spurious pulses in the plane (xOz). However, such a configuration is however, given as an example, since the angles $\beta'_3$ and $\beta_3''$ can be both non-zero.

Advantageously, the following condition is verified:

$$\beta_2' = \frac{((n_3-1)\cdot\beta_{3'})}{n_2-1} \text{ and } \beta_2'' = \frac{((n_3-1)\cdot\beta_{3''})}{n_2-1}$$

In a preferred example of use, the third medium M3 is identical to the second medium M2 and to the first medium M1. Thus, n1=n2=n3 and $\beta_1=\beta_2=\beta_3$. Advantageously, the first medium M1, the second medium M2 and the third medium M3 were manufactured during the same manufacturing process.

The front face 20 of the third medium M3 is suitable for receiving the beam $F_{R2}$ at the output of the second active laser medium M2 and for reflecting a spurious beam, called the third spurious beam $F_{P3}$ (not shown in FIGS. 2 and 3 so as not to overload the figures) and for refracting a beam, called the third useful beam $F_{R3}$, after such a beam has been reflected by the rear face 22 of the third medium M3.

The rear face 22 of the third medium M3 is suitable for reflecting the beam $F_{R2}$ at the output of the second active laser medium M2, after the passage thereof through the front face 20 of the third medium M3, so as to form the useful beam $F_{R3}$.

The rear face 22 of the third medium M3 is suitable for being cooled by a cooling device which is e.g. comprised in the amplification device 10. The cooling is represented in FIG. 2 3 by an arrow appended to the rear face 22 of the third medium M3.

Advantageously, the front face 20 of the third medium is anti-reflection treated.

The fourth medium M4 is a solid medium. The fourth medium M4 is e.g. a crystal such as titanium-doped sapphire, or Yb:YAG, Yb:CaF2 or a polymer, a ceramic or a glass or any other material in the solid state.

The fourth medium M4 has a fourth refractive index n4.

Preferentially, the following relationship is verified:

$$n4 \gg \frac{(n4-1)}{v4}$$

Where ν4 is the constringence of the fourth active laser medium M4. The above is intended to preserve the multi-wavelength character of the beam $F_S$ at the output of the amplification device 10.

The fourth medium M4 has at least two plane faces among a front face 20 suitable for receiving the beam to be amplified, called the incident beam $F_I$, and a reflective rear face 22.

The front face 20 is inclined with respect to the rear face 22 at a non-zero inclination $\beta_4$ (angle). The fourth medium M4 thereby has the shape of a disk, the front and rear faces of which are inscribed in a prism with a trapezoidal base (FIGS. 2 and 3) or a triangular base. Hereinafter, $\beta_4'$ is the projection of the inclination $\beta_4$ on the plane (xOz) and $\beta_4''$ is the projection of the inclination $\beta_4$ on the plane (yOz).

In the particular example shown in FIGS. 2 and 3, the angle $\beta_4'$ is equal to the inclination $\beta_4$ and the angle $\beta_4''$ is zero. The base of the fourth medium M4 is thereby contained in a plane parallel to the plane (xOz). As will be described hereinafter, the above can be used for ejecting the spurious pulses in the plane (xOz). However, such a configuration is however, given as an example, since the angles $\beta'_4$ and $\beta_4''$ can be both non-zero.

In a preferred example of use, the fourth medium M4 is identical to the third medium M3. Thereby, n3=n4 and $\beta_3=\beta_4$. Advantageously, the third medium M3 and the fourth medium M4 were manufactured during the same manufacturing process.

Advantageously, the front face 20 is anti-reflection treated.

The rear face 22 is suitable for being cooled by a cooling device which is e.g. comprised in the amplification device 10. The cooling is represented in FIGS. 2 and 3 by an arrow appended to the rear face 22.

The fourth active laser medium M4 is arranged along the path of the beam $F_{R3}$ reflected by the rear face 22 and refracted by the front face 20 of the third active laser medium M3. Such a beam $F_{R3}$ is thus received by the front face 20 of the fourth medium M4. Thereby, the front face 20 of the fourth medium M4 is suitable for reflecting a spurious beam, called the fourth spurious beam $F_{P4}$ and for refracting a useful beam $F_{R4}$ after such a beam was reflected by the rear face 22 of the fourth medium M4.

The third inclination $\beta_3$, the fourth inclination $\beta_4$, the orientation of the third active laser medium M3 and the orientation of the fourth active laser medium M4 are chosen so that the output beam $F_{R4}$ of the fourth active laser medium M4 (corresponding to the output beam $F_S$ of the amplification device 10 in FIGS. 2 and 3) has a diameter substantially equal to the diameter Φ of the incident beam $F_I$ and that the sub-beams of each wavelength, forming said output beam $F_{R4}$, are parallel to each other at the output of the fourth active laser medium M4. Thus, the third medium M3 and the fourth medium M4 are used for compensating for the chromatic lateral dispersion of the beam.

Advantageously, the following condition is verified:

$$\beta_3' = \frac{((n_4-1)\cdot\beta_{4'})}{n_3-1} \text{ and } \beta_3'' = \frac{((n_4-1)\cdot\beta_{4''})}{n_3-1}$$

Advantageously, the fourth active laser medium M4 is arranged with respect to the third active laser medium M3 so that:

- the front face 20 of the third active laser medium M3 is parallel to the front face of the fourth active laser medium M4, and
- the rear face 22 of the third active laser medium M3 is parallel to the rear face 22 of the fourth active laser medium M4.

Thereby, if the two media M3 and M4 were joined together without modifying the respective orientations thereof, an optical surface with parallel faces would be obtained.

Advantageously, the third active laser medium M3 is arranged outside the path of the second spurious beam $F_{P2}$.

Advantageously, the fourth active laser medium M4 is arranged outside the path of the third spurious beam $F_{P3}$.

Preferentially, the first medium M1, the second medium M2, the third medium M3 and the fourth medium M4 are identical (same materials, same angles), and were e. g. manufactured during the same manufacturing cycle or process. Such particular case is illustrated in FIG. 2. In such particular case, there is an axis of symmetry As between the first and the second medium, and the third and fourth medium. The fourth medium M4 is thereby symmetrical to the first medium M1 with respect to the axis of symmetry As; and the third medium M3 is symmetrical to the second medium M2 with respect to the axis of symmetry As.

FIG. 3 illustrates another example of use of the second embodiment wherein the first medium M1 and the second medium M2 are identical and the third medium M3 and the fourth medium M4 are identical, but different from the first medium M1 and from the second medium M2. In such case, there is no axis of symmetry between the first and the second medium, and the third and the fourth medium.

During the functioning of the amplification device 10 according to the second embodiment, in addition to the functioning described for the first embodiment, the useful beam $F_{R2}$ at the output of the second medium M2 is received on the front face 20 of the third medium M3, which gives a third spurious reflection $F_{P3}$ and a third useful beam $F_{R3}$ (reflected on the rear face 22 and refracted on the front face 20 of the third medium M3). The third useful beam $F_{R3}$ is received on the front face 20 of the fourth medium M4, which gives a fourth spurious reflection $F_{P4}$ and a fourth useful beam $F_{R4}$ (reflected on the rear face 22 and refracted on the front face 20 of the fourth medium M4). It should be noted that in FIGS. 2 and 3, for the sake of clarity, the spurious reflections and $F_{P3}$ have not been shown.

The configuration of the third medium M3 and of the fourth medium M4 with respect to the first medium M1 and to the second medium M2 can thereby be used for compensating for the chromatic lateral dispersion of the amplified output beam of the amplification device 10.

Thereby, in addition to the advantages of the first embodiment, the amplification device 10 according to the second embodiment is used for compensating for the chromatic lateral dispersion induced during the crossings of the first active laser medium M1, without bringing in additional losses. On the other hand, the compensation is carried out by other active laser media which bring in an amplification gain.

The person skilled in the art will understand that FIGS. 2 and 3 illustrate only four active laser media, however the advantages of the second embodiment are generalized to a larger number of successive active laser active media with the condition that this number is a multiple of four (a multiple of two but not four would only compensate for chromatic spatial dispersion but not for chromatic lateral dispersion).

Thus, the second embodiment is generalized as follows. The first medium M1, the second medium M2, the third medium M3 and the fourth medium M4 form a so-called the reference amplification unit. The beam $F_{R4}$ reflected by the rear face 22 and refracted by the front face 20 of the fourth medium M4 forms the output beam $F_S$ of the reference amplification unit. The amplification device 10 comprises one or a plurality of successive amplification units, identical to the reference amplification unit, each amplification unit being arranged so as to receive, as an input beam, the output beam of the preceding amplification unit.

Thereby, the number of amplification units (hence of active laser media) is adjustable according to the desired amplification level.

Other additions are also conceivable for the second embodiment. E.g. an afocal [lens] is suitable for being inserted along the path of the light beam between the second medium M2 and the third medium M3 in order to increase the size of the beam between the second medium M2 and the third medium M3. The amplification gain is thereby optimized.

Also, in a variant of use, a baffle is suitable for being inserted into the path of the light beam between the second medium M2 and the third medium M3. The baffle is e.g. formed by two plane mirrors inclined at 45° one with respect to the other. In this way it is possible to use a different geometrical arrangement of the active laser media ("in-line").

According to a third embodiment, as can be seen in FIG. 4, the elements identical to the amplification device 10 according to the first embodiment described with reference to FIG. 1, are not repeated. Only the differences are highlighted.

In the third embodiment, in addition to the elements of the first amplification device 10, the amplification device 10 comprises an optical compensation assembly 30 suitable for compensating the widening $\Delta\Phi$ of the beam $F_{R2}$ at the output of the second active laser medium M2 (beam reflected by the rear face 22 and refracted by the front face 20) so that the beam $F_S$ at the output of the amplification device 10 has a diameter substantially equal to the diameter $\Phi$ of the incident beam $F_I$.

As illustrated in FIG. 4, the compensation optical assembly 30 comprises at least one mirror 40 (plane mirror) arranged so that the output beam $F_S$ of the amplification device is superposed on the incident beam $F_I$.

Thereby, the mirror 40 is arranged in such a way that the beam $F_{R2}$ at the output of the last medium, in the present case the second medium M2, travels a return path superimposed on the outward path by passing again through the active laser media.

According to the principle of reversibility of light, in this way it is possible to compensate for the chromatic lateral dispersion in the beam $F_S$ at the output of the amplification device 10.

During the functioning of the amplification device 10 according to the third embodiment, in addition to the operation described for the first embodiment, the laser beam travels a reverse return so that the beam exits via the first medium M1 superimposed on the incident beam $F_I$.

Thereby, in addition to the advantages of the first embodiment, the amplification device 10 according to the third embodiment is used for compensating for the chromatic lateral dispersion induced during the crossings of the first active laser medium M1, without bringing in additional losses. On the other hand, the compensation is accompanied by an additional amplification since the laser beam passes again through the first medium M1 and the second medium M2.

A person skilled in the art would understand that the embodiments described hereinabove are likely to be combined with one another when such a combination is compatible.

More particularly, the second and third embodiments are entirely compatible, regardless of the number of amplification units.

Furthermore, a person skilled in the art will understand that the first and the third embodiments are generalized to a larger number of successive active laser media, provided that the number is a multiple of two. For the first embodiment, when such number is a multiple of four, this is equivalent to the second embodiment, and when the number is a multiple of two but not of four, only the advantages of the first embodiment are obtained. For the third embodiment, the advantages of the third embodiment are obtained regardless of the number of successive active laser media, provided that the number is a multiple of two.

Finally, it will also be understood that FIGS. 1 to 4 are given as examples with an angle for the active laser media inducing that the base of each active laser medium is in a plane parallel to the plane of propagation of the laser beam (plane (xOz)). Nevertheless, such angle can take other values, and, more particularly, can have a non-zero projection in each of the planes (xOz) and (yOz).

The invention claimed is:

1. A device for amplifying a multi-wavelength laser beam, the device comprising:

a. a first solid active laser medium having a first refractive index, the first active laser medium having at least two plane faces among a front face suitable for receiving the beam to be amplified, called the incident beam, and a reflective rear face, the front face being inclined with respect to the rear face at a first non-zero inclination, the rear face being suitable for being cooled, and b. a second solid active laser medium having a second refractive index, the second active laser medium having at least two plane faces among a front face suitable for receiving the beam reflected by the rear face and refracted by the front face of the first active laser medium, and a reflective rear face, the front face being inclined with respect to the rear face at a second non-zero inclination, the rear face being suitable for being cooled, the second active laser medium being arranged along the path of the beam reflected by the rear face and refracted by the front face of the first active laser medium, the first inclination, the second inclination and the orientation of the second active laser medium being such that the sub-beams of each wavelength, forming the output beam of the second active laser medium, are parallel to each other at the output of the second active laser medium.

2. The amplification device according to claim 1, wherein the front face of the first active laser medium is perpendicular to an axis Oz, the first inclination forming an angle $\beta_1$' on a plane xOz and $\beta_1$" on a plane yOz, the second inclination forming an angle $\beta_2$' on a plane xOz and $\beta_2$" on a plane yOz, the following condition being satisfied:

$$\beta_1' = \frac{((n_2 - 1)\cdot\beta_{2'})}{n_1 - 1} \text{ and } \beta_1'' = \frac{((n_2 - 1)\cdot\beta_{2''})}{n_1 - 1}.$$

3. The amplification device according to claim 1, wherein the second active laser medium is arranged with respect to the first active laser medium such that:

a. the front face of the second active laser medium is parallel to the front face of the first active laser medium, and b. the rear face of the second active laser medium is parallel to the rear face of the first active laser medium.

4. The amplification device according to claim 1, wherein the beam at the output of the second active laser medium has a widened diameter compared to the diameter of the incident beam, the amplification device comprising an optical compensation assembly suitable for compensating the widening of the beam at the output of the second active laser medium so that the beam at the output of the amplification device has a diameter substantially equal to the diameter of the incident beam.

5. The amplification device according to claim 4, wherein the optical compensation assembly comprises:

a. a third solid active laser medium having a third refractive index, the third active laser medium having at least two plane faces among a front face suitable for receiving the beam at the output of the second active laser medium and a reflective rear face, the front face being inclined with respect to the rear face at a third non-zero inclination, the rear face being suitable for being cooled, b. a fourth solid active laser medium having a fourth refractive index, the fourth active laser medium having at least two plane faces among a front face suitable for receiving the beam reflected by the rear face and refracted by the front face of the third active laser medium, and a reflective rear face, the front face being inclined with respect to the rear face at a fourth non-zero inclination, the rear face being suitable for being cooled, the fourth active laser medium being arranged along the path of the beam reflected by the rear face and refracted by the front face of the third active laser medium, the third inclination, the fourth inclination, the orientation of the third active laser medium and the orientation of the fourth active laser medium being such that the output beam of the fourth active laser medium has a diameter substantially equal to the diameter of the incident beam and the sub-beams of each wavelength, forming said output beam, are parallel to each other at the output of the fourth active laser medium.

6. The amplification device according to claim 5, wherein the front face of the third active laser medium is perpendicular to an axis Oz, the third inclination forming an angle $\beta_3$' on a plane xOz and $\beta_3$" on a plane yOz, the third inclination forming an angle $\beta_3$' on a plane xOz and $\beta_3$" on a plane yOz, the following condition being satisfied:

$$\beta_3' = \frac{((n_4 - 1)\cdot\beta_{4'})}{n_3 - 1} \text{ and } \beta_3'' = \frac{((n_4 - 1)\cdot\beta_{4''})}{n_3 - 1}.$$

7. The amplification device according to claim 5, wherein the third active laser medium is arranged with respect to the fourth active laser medium such that:

a. the front face of the third active laser medium is parallel to the front face of the fourth active laser medium, and
b. the rear face of the third active laser medium is parallel to the rear face of the fourth active laser medium.

8. The amplification device according to claim 5, wherein the first active laser medium, the second active laser medium, the third active laser medium- and the fourth active laser medium are identical.

9. The amplification device according to claim 5, wherein the first medium, the second medium, the third medium- and the fourth medium form a so-called reference amplification unit, the beam reflected by the rear face and refracted by the front face of the fourth medium forming the output beam of the reference amplification unit, the amplification device comprising one or a plurality of successive amplification units identical to the reference amplification unit, each amplification unit being arranged for receiving, as an input beam, the output beam of the preceding amplification unit.

10. The amplification device according to claim 4, wherein the compensation optical assembly comprises at least one mirror arranged in such way that the output beam of the amplification device is superimposed on the incident beam.

* * * * *